United States Patent [19]

Müller

[11] 3,829,742

[45] Aug. 13, 1974

[54] VOLTAGE TRANSFORMER FOR A FULLY INSULATED METAL-CLAD, HIGH-VOLTAGE SWITCHING INSTALLATION

[75] Inventor: Willi Müller, Berlin, Germany

[73] Assignee: Siemens Aktiengesellschaft, Munich, Germany

[22] Filed: Sept. 17, 1973

[21] Appl. No.: 397,922

[30] Foreign Application Priority Data

Sept. 15, 1972 Germany.......................... 2245779

[52] U.S. Cl.................... 317/103, 307/149, 323/74, 323/93, 317/12 R
[51] Int. Cl. ........................................... H02b 1/18
[58] Field of Search ........ 317/99, 103, 12; 307/149; 324/74, 93

[56] References Cited
UNITED STATES PATENTS 3,101,443    8/1963    Fried..................................... 323/93
3,315,152    4/1967    Lindley................................. 323/74

Primary Examiner—Robert K. Schaefer
Assistant Examiner—Gerald P. Tolin
Attorney, Agent, or Firm—Kenyon & Kenyon Reilly Carr & Chapin

[57] ABSTRACT

A voltage transformer is disclosed for a fully insulated metal-clad, high-voltage switching installation equipped with a metal outer tube surrounding a high-voltage conductor. The voltage transformer includes a pressure vessel mounted gas-tight to the outer tube of the switching installation. A metal rod-like extension is connected to the high-voltage conductor and is arranged in the pressure vessel. A laminar electrode is also arranged within the pressure vessel in surrounding relation to the rod-like extension to conjointly define therewith a high-voltage capacitor. A low-voltage capacitor is connected to the high-voltage capacitor so as to constitute therewith a capacitive voltage divider. An amplifier is connected to low-voltage capacitor and has an output connectable to a load.

6 Claims, 2 Drawing Figures

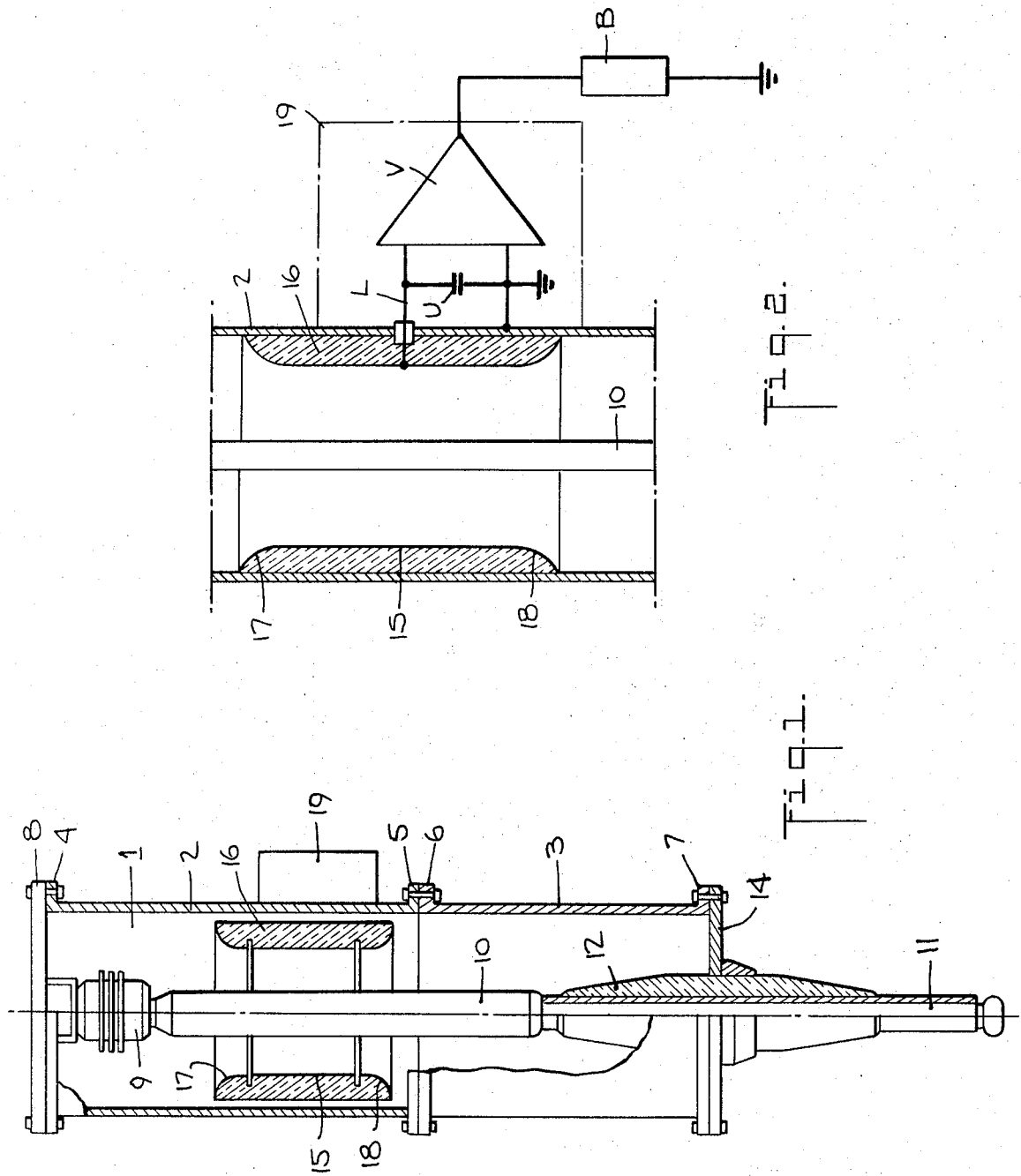

VOLTAGE TRANSFORMER FOR A FULLY INSULATED METAL-CLAD, HIGH-VOLTAGE SWITCHING INSTALLATION

BACKGROUND OF THE INVENTION

The invention relates to a voltage transformer for a fully insulated, metal-clad, high-voltage switching installation. A voltage transformer of this type is disclosed in the copending application, Ser. No. 253,778, filed May 16, 1972, now U.S. Pat. No. 3,763,378 and entitled: *Voltage Transformer For Fully Insulated Metal-clad Switching Installations.*

It is advantageous if the voltage transformer is unaffected by the magnetic fields developed by the current-conducting parts of the switching installation. In addition, it is also desirable to minimize the effects of temperature changes on the voltage transformer occurring in the current-conducting portions of the installation. Such temperature variations and the magnetic fields can introduce errors into the measurements made with the aid of the voltage transformer.

Accordingly, it is an object of the invention to provide a voltage transformer wherein measuring failures introduced by undesired influences of the switching installation are eliminated.

SUMMARY OF THE INVENTION

The voltage transformer according to the invention is suitable for use with a fully insulated, metal-clad high-voltage switching installation equipped with a metal outer tube surrounding a high-voltage conductor.

The voltage transformer of the invention includes as a feature a pressure vessel mounted gas-tight to the outer tube of the switching installation. A metal rod-like extension is connected to the high-voltage conductor and is arranged in the pressure vessel. A laminar electrode is also arranged within the pressure vessel in surrounding relation to the rod-like extension to conjointly define therewith a high-voltage capacitor. A low-voltage capacitor is connected to the high-voltage capacitor so as to constitute therewith a capacitor voltage divider. An amplifier is connected to the low-voltage capacitor and has an output connectable to a load.

The voltage transformer according to the invention has the advantage that it is not influenced by magnetic fields from the current-carrying part of the installation. In addition, with the voltage transformer of the invention, the effect of temperature changes in the current-carrying part of the high-voltage switching installation is greatly reduced.

The construction of the voltage transformer according to the invention with respect to the configuration of the pressurized vessel can be carried out in different ways. However, it is advantageous if the pressurized vessel consists of at least one cylindrical part with the same radial dimensions as the outer tube of the high-voltage switching installation and if at least one cover member is provided at the end facing away from the high-voltage switching installation for a gas-tight closure of the pressurized vessel. The cover member serves to hold the rod-like extension. This configuration of the pressurized vessel is advantageous mainly because the tubes used for the construction of the high-voltage switching installation can also be used to configure the pressurized vessel.

An especially advantageous embodiment of the voltage transformer according to the invention is provided when the pressurized vessel carries a further end-face cover member at its end facing the high-voltage switching installation for obtaining a gas-tight closure of the pressurized vessel with respect to the installation. According to still another feature, the further cover member includes feedthrough means for accommodating the rod-shaped extension. The feedthrough means can be a feed-through bushing in the further cover member or a feedthrough opening formed in the further cover member. This embodiment of a voltage transformer makes it possible to fabricate the voltage transformer as a closed, self-contained unit in a separate pressurized vessel. The voltage transformer according to the invention can then be attached at freely selectable measuring locations of the high-voltage switching installation.

The placement of the low-voltage capacitor which is located outside the switching installation and the amplifier connected to the low-voltage capacitor can be accomplished in various ways. However, it is advantageous if a housing is securely mounted on the pressurized vessel. The low-voltage capacitor and the amplifier are then accommodated within the housing.

Although the invention is illustrated and described herein as a voltage transformer for a fully insulated, metal-clad, high-voltage switching installation, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWINGS

FIG. 1 is a schematic diagram, partially in section, of the voltage transformer according to the invention.

FIG. 2 is a schematic diagram showing the capacitive divider and amplifier.

DESCRIPTION OF THE PREFERRED EMBODIMENTS OF THE INVENTION

The voltage transformer shown in FIG. 1 has a pressurized vessel 1 which includes two cylindrical parts 2 and 3. The cylindrical parts 2 and 3 are provided at their end-faces with flanges 4,5 and 6,7, respectively. The cylindrical parts 2 and 3 of the pressurized vessel 1 are joined together at the flanges 5 and 6. An end-face cover member 8 is secured in a gas-tight manner on the flange 4 of the cylindrical part 2. A supporting insulator 9 is mounted on the end-face cover member 8 to support a metal high-voltage electrode 10 which is connected to a metal rod 11 in a high-voltage bushing 12.

At its lower end shown in the drawing, the metal rod 11 is connectable in plug-in fashion with the inner conductor of a high-voltage switching installation (not shown). The metal rod 11 forms with the electrode 10 a rod-shaped extension on the inner conductor of the high-voltage switching installation. The high-voltage bushing 12 is held in place at the end-face of the pressurized vessel by a further end-face cover member 14 which is attached to the flange 7 in a gas-tight manner.

The cover 14 need not be used if, for example, a disc-type feedthrough is used as the high-voltage bushing 12; then the rim of the feedthrough is secured to the flange 7.

Inside the pressurized vessel 1, in addition to the metal extension (10, 11), a measuring electrode 15 is provided. The electrode 15 surrounds the metal extension 10, 11 at a uniform spacing and conjointly defines a high-potential capacitor therewith. The measuring electrode 15 is mounted on the electrode support 16 made of insulating material. The electrode 15 can be provided with guard ring electrodes 17 and 18 at both ends which impart a defined capacitance to the high-voltage capacitor.

Referring to FIG. 2, a line runs from the measuring electrode 15 into the housing 19 mounted on the outside of the pressurized vessel 1. At the housing 19, the line is connected there to the low-potential capacitor U of the capacitive divider. An amplifier V is also located in the housing and has an input connected to the low-potential capacitor U. The amplifier can supply a load B which can be, for example, a measuring instrument and/or a system protection device.

The voltage transformer for completely insulated, metal-clad high-voltage switching system is disclosed which is a self-contained unit and can therefore be attached at freely selectable measurement locations of the high-voltage switching installation. The voltage transformer of the invention enables very accurate voltage measurements to be made.

What is claimed is:

1. A voltage transformer for a fully insulated, metal-clad, high-voltage switching installation equipped with a metal outer tube surrounding a high-voltage conductor of the installation, the voltage transformer comprising: a pressure vessel mounted gas-tight to the outer tube of the switching installation; a metal rod-like extension connected to the high-voltage conductor and arranged in said pressure vessel; a laminar electrode also arranged within said pressure vessel in surrounding relation to said rod-like extension to conjointly define therewith a high-voltage capacitor; a low-voltage capacitor connected to said high-voltage capacitor so as to constitute therewith a capacitive voltage divider; and, an amplifier connected to said low-voltage capacitor, said amplifier having an output connectable to a load.

2. The voltage transformer of claim 1, said pressure vessel comprising at least one cylindrical part having a radial dimension corresponding to the radial dimension of the outer tube of the high-voltage switching installation and having one end facing away from the switching installation, and at least one end-face cover member for closing said pressure vessel in a gas-tight manner at said one end of said cylindrical part, and holding means at said cover member for holding said rod-like extension.

3. The voltage transformer of claim 2 wherein said cylindrical part has an end facing the switching installation, said pressure vessel having a further end-face cover member disposed on said last-mentioned end of said cylindrical part for closing said pressure vessel in a gas-tight manner with respect to the high-voltage switching installation, and feedthrough means at said further end-face cover member for accommodating the through passage of said rod-like extension.

4. The voltage transformer of claim 3, said feed-through means being a feed-through bushing mounted on said further end-face cover member.

5. The voltage transformer of claim 3, said feed-through means being a passage formed in said further end-face cover member.

6. The voltage transformer of claim 1 comprising a housing securely mounted to said pressure vessel, said low-voltage capacitor and said amplifier being arranged in said housing.

* * * * *